(12) United States Patent
Pitt

(10) Patent No.: US 7,464,903 B2
(45) Date of Patent: Dec. 16, 2008

(54) METHODS AND APPARATUS FOR VIBRATION AND BUFFET SUPPRESSION

(75) Inventor: Dale M. Pitt, Affton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/866,393

(22) Filed: Oct. 2, 2007

(65) Prior Publication Data

US 2008/0023588 A1 Jan. 31, 2008

Related U.S. Application Data

(62) Division of application No. 10/825,920, filed on Apr. 15, 2004, now Pat. No. 7,338,017.

(51) Int. Cl.
*B64C 13/02* (2006.01)

(52) U.S. Cl. ............... 244/174; 244/99.13; 244/99.8; 91/167 R

(58) Field of Classification Search ............... 244/75.1, 244/99.13, 99.3, 174, 99.8, 87, 195; 181/118; 188/380, 379, 378; 257/136
See application file for complete search history.

(56) References Cited

U.S. PATENT DOCUMENTS

| 4,751,821 A | 6/1988 | Birchard |
| 5,135,186 A | 8/1992 | Ako |
| 6,257,528 B1 | 7/2001 | Brislawn |
| 6,481,667 B1 | 11/2002 | Ho |
| 6,821,090 B1 | 11/2004 | Hassan et al. |

FOREIGN PATENT DOCUMENTS

JP 2004299541 10/2004

OTHER PUBLICATIONS

Burnham et al., "An Advanced Buffet Load Alleviation System", (2001) American Institute of Aeronautics and Astronautics. Presented at the 42nd AIAA/ASME/ASCE/AHS/ASC Structures, Structural Dynamics, and Materials Conference and Exhibit, Seattle, Washington, Apr. 16-19, 2001, pp. 1-10.
http://www.answers.com/topic/clevis, retrieved on Jan. 30, 2007, 1 pg.

*Primary Examiner*—Timothy D Collins
(74) *Attorney, Agent, or Firm*—Lee & Hayes, PLLC

(57) ABSTRACT

Apparatus and methods for hybrid actuation and suppressing vibration are disclosed. In one embodiment, a hybrid actuator includes a first actuator and a second actuator linked to move a component a combined actuation distance. The first actuator may include a hydraulic piston, and the second actuator may include a piezo-electric actuator. In another embodiment, the first actuator is activated within a first frequency range, and the second actuator is activated within a second frequency range. In another aspect, a method is provided combining a first actuation movement and a second actuation movement. In another embodiment, a system is provided for suppressing movement of a component including a combination of actuators. In a further embodiment, an aircraft is provided with hybrid motion suppression including a first actuator and a second actuator linked to activate a control surface.

19 Claims, 8 Drawing Sheets

METHODS AND APPARATUS FOR VIBRATION AND BUFFET SUPPRESSION

CROSS REFERENCE TO RELATED APPLICATIONS

This patent application is a divisional application of co-pending, commonly-owned U.S. patent application Ser. No. 10/825,920 entitled "Methods and Apparatus for Vibration and Buffet Suppression" filed on Apr. 15, 2004, which application is incorporated herein by reference.

FIELD OF THE DISCLOSURE

The present disclosure relates generally to actuators and, more specifically, to vibration suppression actuators.

BACKGROUND OF THE DISCLOSURE

Aircraft and other equipment encounter or create vibration that can adversely affect their components. In aircraft, for example, turbulence can induce buffeting of aircraft appendages and components. Movement of a vehicle along a rough surface can result in shock and vibrational movement of the contents of the vehicle. Operating machinery in the equipment itself may also generate undesired vibration.

Vibration and/or buffeting may make it desirable to strengthen the vibrated components to reduce fatigue, to otherwise build-in shock absorbing materials, or to otherwise strengthen the vibrated components against the effects of vibration. These steps may be expensive, cumbersome, and may add weight to the vehicle or equipment. For example, aircraft appendages such as tail surfaces may be strengthened to reduce fatigue resulting from turbulence buffeting of the tail in certain flight configurations. Reinforcing the aircraft tail results in increased overall weight of the aircraft, potentially affecting performance. The vibration or buffeting can occur at frequencies higher than 20 Hz. Dynamic buffet and vibration suppression devices often do not add sufficient response speeds to respond to such higher frequency vibrations or stresses. Accordingly, there is unmet need for improved methods and apparatus for vibration and buffet suppression.

SUMMARY

The present disclosure is directed to apparatus and methods for hybrid actuation and suppressing vibration. In one embodiment, a hybrid actuator includes a first actuator and a second actuator linked to move a component a combined actuation distance. The first actuator may include a hydraulic piston, and the second actuator may include a piezo-electric actuator. In another embodiment, the first actuator is activated within a first frequency range, and the second actuator is activated within a second frequency range. In another aspect of the disclosure, a method is provided combining a first actuation movement and a second actuation movement. In yet another embodiment, a system is provided for suppressing movement of a component including a combination of actuators. In a still further embodiment, an aircraft is provided with hybrid motion suppression including a first actuator and a second actuator linked to activate a control surface.

The features, functions, and advantages that have been described above or will be discussed below can be achieved independently in various embodiments, or may be combined in yet other embodiments, further details of which can be seen with reference to the following description and drawings.

BRIEF DESCRIPTION OF THE DRAWINGS

Embodiments of the present disclosure are described in detail below with reference to the following drawings.

DETAILED DESCRIPTION

The present disclosure relates to apparatus and methods for hybrid actuation and vibration and buffet suppression. Many specific details of certain embodiments of the disclosure are set forth in the following description and in FIGS. 1-8 to provide a thorough understanding of such embodiments. One skilled in the art, however, will understand that the present disclosure may have additional embodiments, or that the present disclosure may be practiced without several of the details described in the following description.

Figure 1:
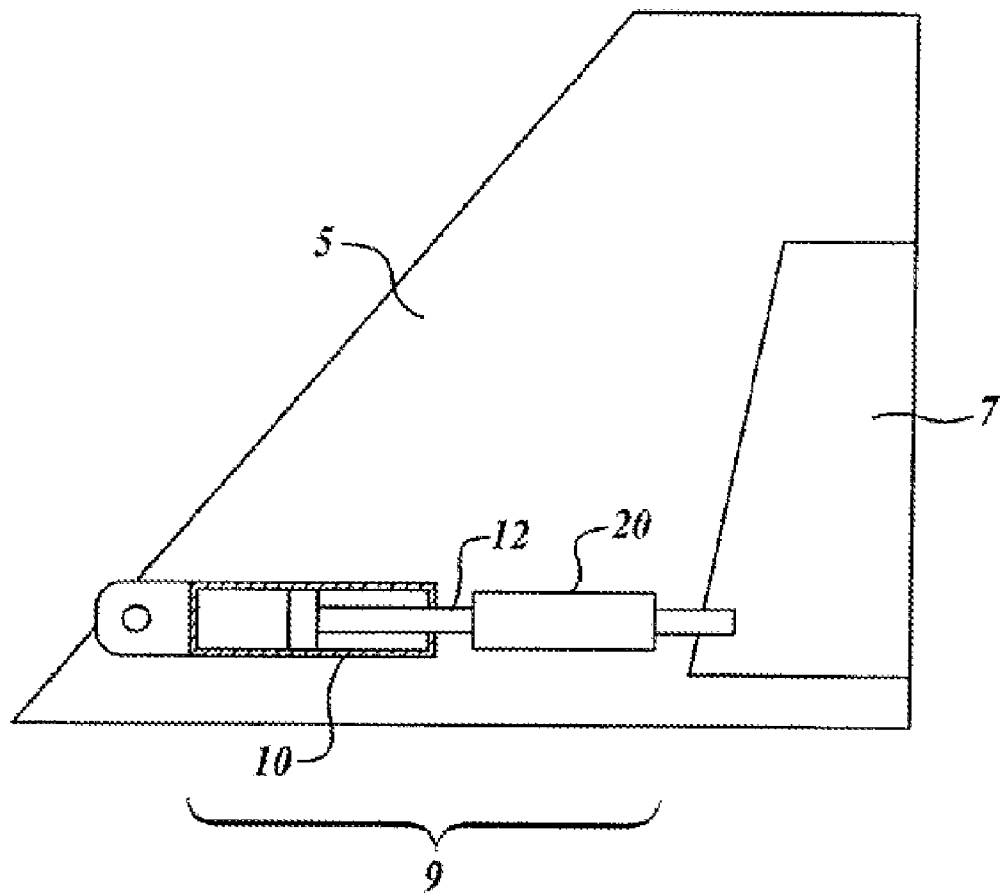
FIG. 1 is a side view of an exemplary hybrid actuator linked to an aircraft control surface in accordance with an embodiment of the present disclosure.

FIG. 1 shows an exemplary hybrid actuator 9 installed to drive an aircraft rudder 7 on an aircraft fin 5, in accordance with an embodiment of the present disclosure. The hybrid actuator 9 includes a hydraulic piston 10 driving a push rod 12 linked to the rudder 7. Installed on the push rod 12 is a cylindrical piezo-electric actuator 20 actuating in line with the piston 12. In this combination, the rudder 7 is thus driven by the combined outputs of the hydraulic piston 10 and the piezo-electric actuator 20. The piezo-electric actuator 20 suitably may include a cylindrical stack actuator such as those manufactured and distributed by Piezomechanik GmbH of Munich, Germany.

The combination of the hydraulic piston 10 and the piezo-electric actuator 20 permits the hybrid actuator 9 to move the rudder 7 at a broad range of frequencies as desired for vibration and buffet suppression. Typically hydraulic actuators have a response speed of less than 25 Hz., while piezo-electric actuators have response speeds that can reach several hundreds or even thousands of Hz.

For example, in a fighter aircraft such as the F/A-18, increased angles of attack produce wing vortices that impinge upon the tail surfaces of the aircraft, resulting in buffeting of the tail appendage. In the F/A-18, by way of example, the buffeting stresses imposed on the tail appendage can result in flexing of the appendage components at frequencies of around 15 Hz and around 45 Hz. A hybrid actuator 9 incorporating a hydraulic piston 10 in combination with the piezo-electric actuator 20 that may suitably respond to both the 15 Hz vibrations and the 45 Hz vibrations by activating the rudder 7 in a contrary direction to the turbulence impacting the rudder 5. In other aircraft, the vibration and buffet frequencies may vary. Similarly, where vibration suppression is desired for equipment rolling or moving along a surface, or to reduce vibrations from the operating machinery itself, a variety of frequencies of vibration may be encountered. A hybrid actuator 9 incorporating a hydraulic piston 10 and a piezo-electric actuator 20 may provide multi-frequency responses to such vibrations.

Figure 2A:
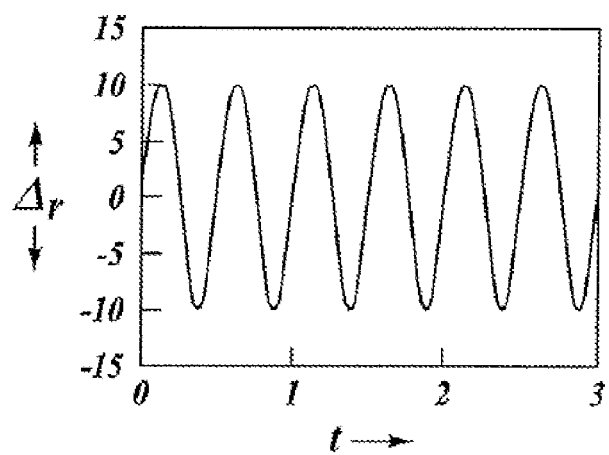
FIG. 2A is a graph of a first frequency actuation response in accordance with an embodiment of the present disclosure.
Figure 2B:
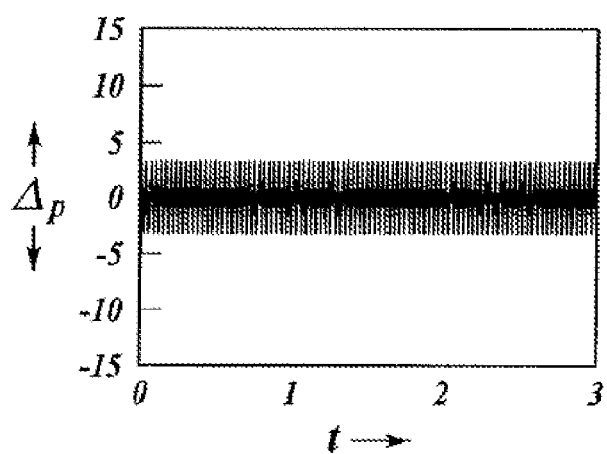
FIG. 2B is a graph of a second frequency actuation response in accordance with an embodiment of the present disclosure.
Figure 2C:
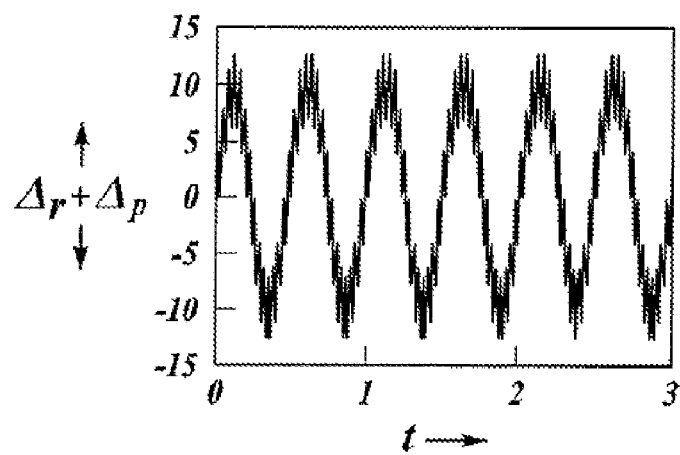
FIG. 2C is a graph of a combined frequency actuation response in accordance with an embodiment of the present disclosure.

FIGS. 2A, 2B and 2C graph deflections of a slow-speed actuator over time, deflections of a higher speed actuator over time, and deflections of a combined slower speed and higher speed actuator over time, respectively. In FIGS. 2A-2C, deflection ($\Delta$) is graphed on the vertical axis and time (t) is graphed horizontally. In FIG. 2A, actuator deflection distance $\Delta r$ of an exemplary hydraulic actuator actuated at a frequency of approximately 2 Hz is shown. In FIG. 2B, the deflection distance $\Delta p$ of an exemplary piezo-electric actuator actuated at approximately 50 Hz is shown.

In FIG. 2C, the deflection distances $\Delta r$ and $\Delta p$ as shown in FIGS. 2A and 2B, are arithmetically combined in accordance with the present disclosure producing a multi-frequency actuation deflection distance ($\Delta r + \Delta p$). The combined actuation distance $\Delta r + \Delta p$ may be controlled by suitable sensor and processor systems, as described further with reference to FIGS. 3 and 7 below, to provide a multi-frequency response actuation.

Figure 3:
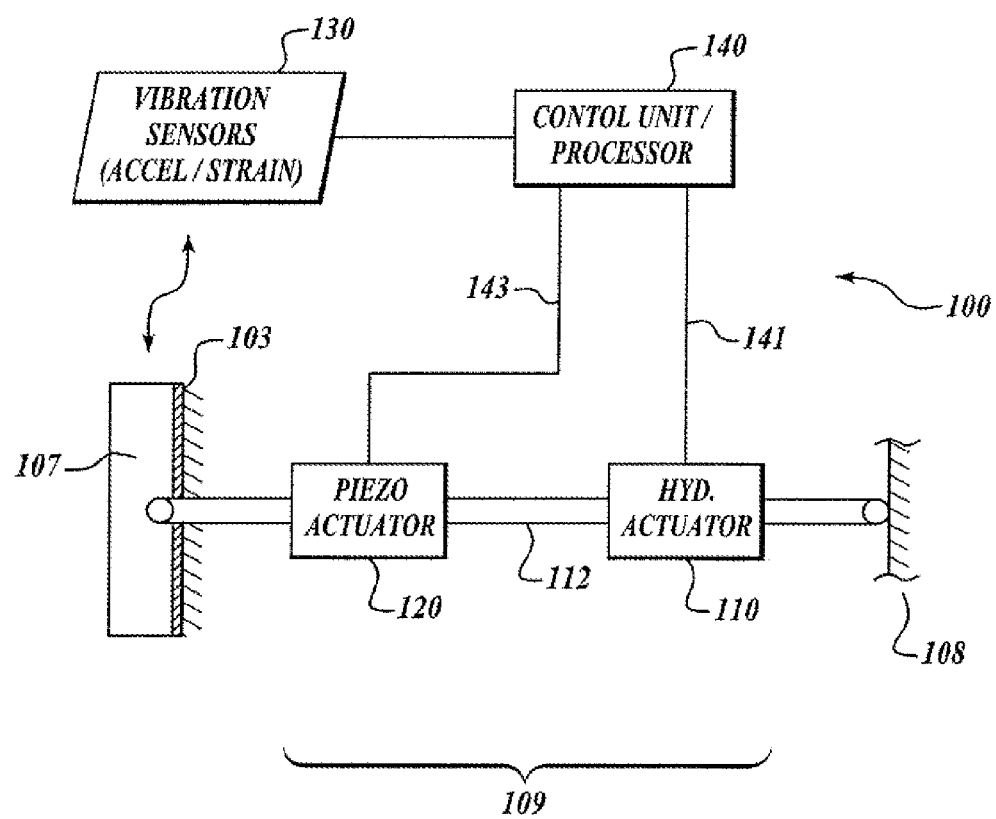
FIG. 3 is a component drawing of an exemplary vibration suppression system in accordance with an embodiment of the present disclosure.

FIG. 3 is a component drawing of an exemplary vibration suppression system 100 in accordance with an embodiment of the present disclosure. A hybrid actuator 109 includes a hydraulic actuator 110, a push rod 112, and a piezo-electric actuator 120. The hybrid actuator 109 is arranged between a base 108 and a hinged aircraft control surface 107. The in hydraulic actuator 110, push rod 112, and piezo-electric actuator 120 are arranged in a co-linear configuration similar to that described with reference to FIG. 1. The hydraulic actuator 110 and the piezo-electric actuator 120 actuated co-linearly can move the aircraft control surface 107 (hinged on a hinge 103) at a combination and variety of frequencies as described with reference to FIG. 2C above.

The system 100 includes vibration sensors 130 that provide input to a control unit or processor 140. The processor 140 through a first control cable 141 drives the hydraulic actuator 110 at lower frequencies in response to lower frequency vibration sensed by the vibrations sensors 130. The processor 140 through a second control cable 143 drives the piezo-electric actuator 120 at higher frequencies in response to higher frequency vibrations sensed by the vibration sensors 130. The vibration sensors 130 for an aircraft, by way of example, but not limitation, suitably may include accelerometers or strain gauges utilized to measure vibration, movement, or deflections. The system 100 then responds to counteract the vibration, movement, or deflections with the processor 140 driving the hybrid actuator 109 deflecting the control surface 107 at suitable frequencies and directions to oppose the undesired vibrations or deflections.

Figure 4:
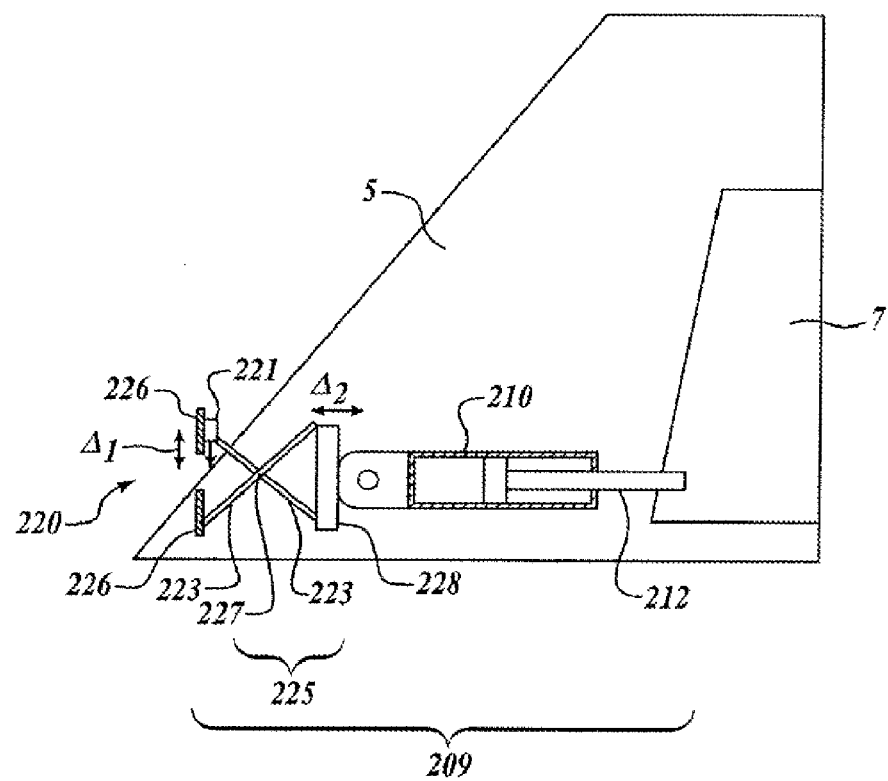
FIG. 4 is a side view of an exemplary X-frame hybrid actuator linked to an aircraft control surface in accordance with an embodiment of the present disclosure.

A hybrid actuator of the present disclosure suitably may include a variety of linkages to combine outputs from two separate actuators to form a third actuation distance. For example, FIG. 4 shows a hybrid actuator 209 in accordance with an embodiment of the present disclosure. The hybrid actuator 209 drives an aircraft rudder 7 attached to an aircraft fin 5. The hybrid actuator 209 includes an X-frame piezo-actuator assembly 225. Mounted to the X-frame piezo-actuator assembly 225 is a hydraulic piston 210. The activating the X-frame piezo-actuator assembly 225 moves the hydraulic piston 210. In turn, the hydraulic piston 210 drives a push rod 212 linked to the rudder 7. Output of the X-frame piezo-actuator assembly 225, and the hydraulic piston 210 are thus additively combined to drive the rudder 7 at a wide variety of frequencies.

More specifically, the X-frame piezo-actuator assembly 225 is mounted to a fixed base 226. The X-frame includes two cross-members 223 joined at a central pivot 227 to form an "X." Attached to one of the cross members 223 is a piezo-electric actuator 221 that drives the one of the attached cross-members 223 laterally, closing and/or opening the "X" around the pivot 227 in the same manner that conventional hand scissors are opened and closed. Attached at an opposite end of the cross-members 223 from the base 226 is a mount 228 that holds the hydraulic piston 210. Activating the piezo-electric actuator 221 to partially open and close the cross-members 223 by a distance $\Delta 1$, moves the mount 223 a lateral distance $\Delta 2$ greater than $\Delta 1$, but with somewhat reduced force that that applied by the piezo-electric actuator 221. The cross-members 223 mounted in a X-frame configuration in the X-frame actuator assembly 225, thus provide somewhat greater actuation distance $\Delta 2$ than would otherwise would be generated by a piezo-electric actuator 221 directly in line with the hydraulic piston 210, such as described in the configuration shown in FIGS. 1 and 3 above.

Figure 5:
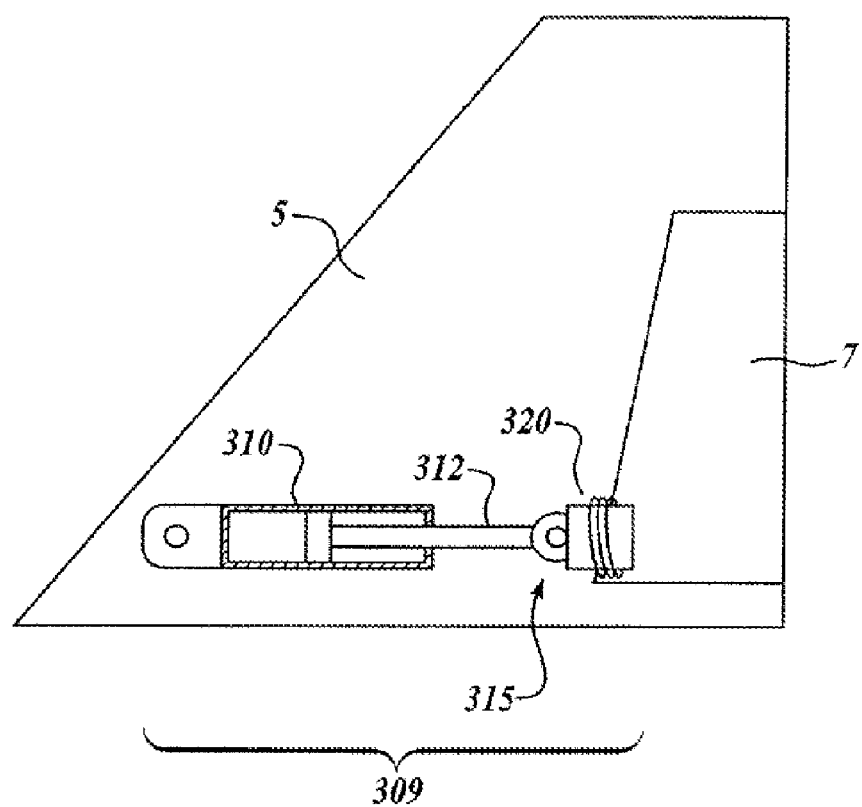
FIG. 5 is a side view of an exemplary active clevis actuator linked to an aircraft control surface in accordance with an embodiment of the present disclosure.

In FIG. 5, a hybrid actuation system 309 in accordance with an embodiment of the present disclosure is shown in side view driving an aircraft rudder 7 linked to an aircraft fin 5. The hybrid actuator 309 includes a hydraulic piston 310 driving a push rod 312. The push rod 312 is linked to a clevis 315 that pivotally joins the push rod 312 to the rudder 7. In this exemplary embodiment, by way of example, but not limitation, a piezo-electric actuator 320 is incorporated into the clevis 315, permitting a portion of the clevis 315 to lengthen and shorten, again with the result that the rudder 7 is driven by an actuation distance that is equal to the combined actuation distance of the hydraulic piston 310 and the piezo-electric actuator 320.

Figure 6:
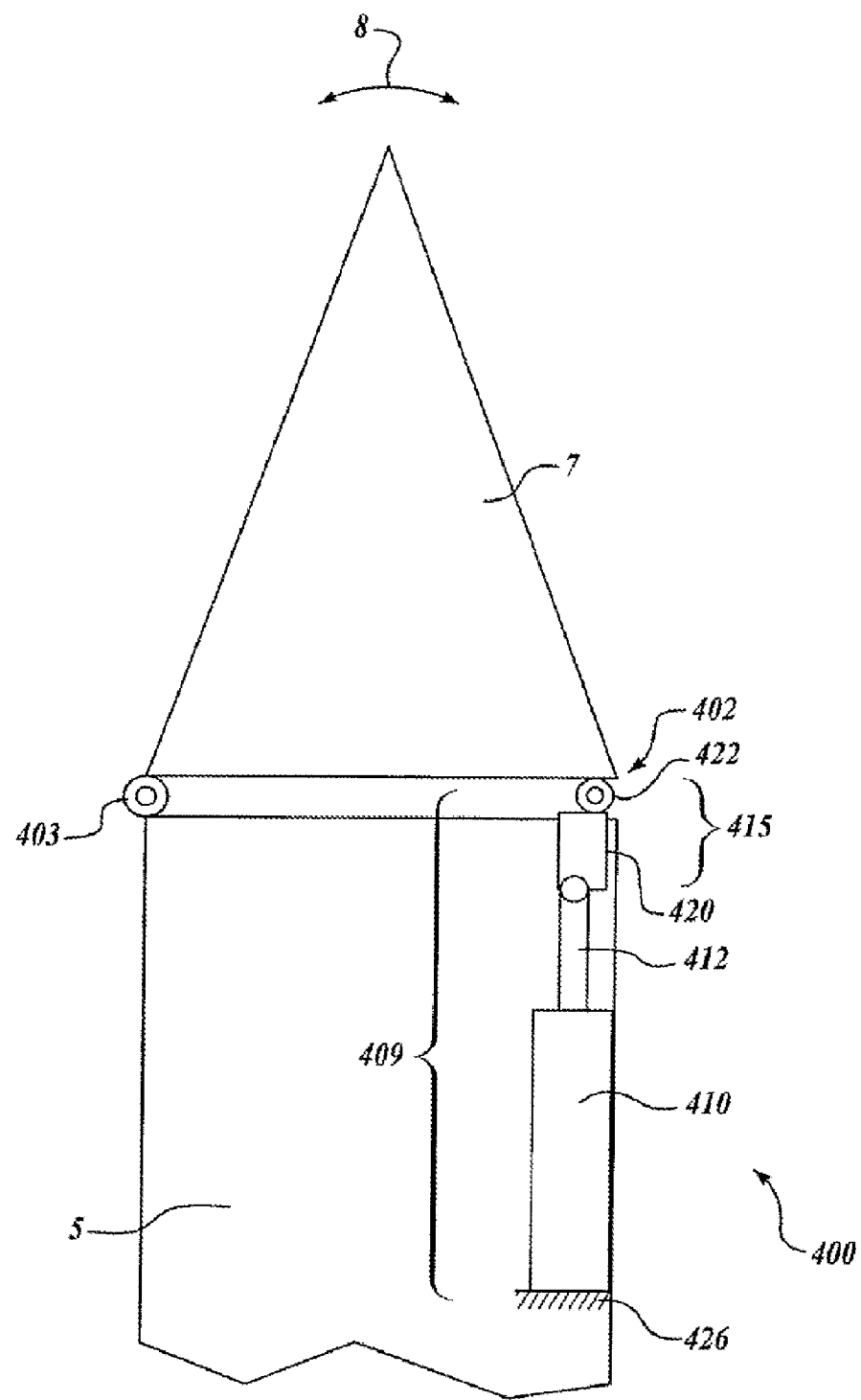
FIG. 6 is a top view cross section of a hybrid rudder actuator system including an active clevis actuator in accordance with an embodiment of the present disclosure.
Figure 7:
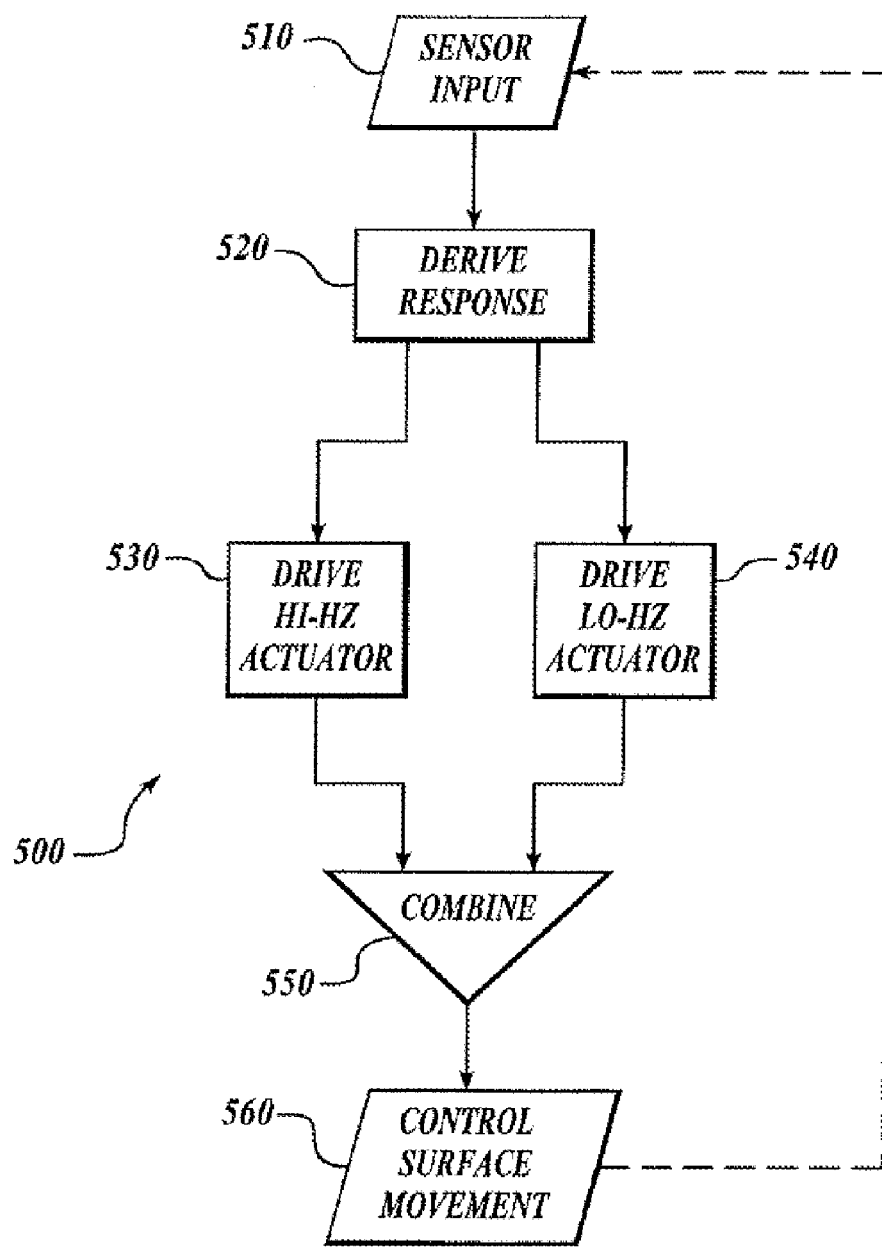
FIG. 7 is a flowchart of a method of vibration suppression in accordance with an embodiment of the present disclosure.

FIG. 6 is a top-view cross-section of an exemplary hybrid actuator system 409 driving an aircraft rudder 7 in accordance with an embodiment of the present disclosure. The rudder 7 is attached to an aircraft fin 5 through a hinge 403. The hybrid actuation system 409 moves the rudder in a side-to-side lateral motion 8 by pushing or pulling the rudder 7 a point 402 offset from the rudder hinge 403. The hybrid actuation system 409 is connected to a fixed base 426. Mounted to the base 426 is a hydraulic piston 410. The piston 410 drives a push rod 412 linked to an active clevis 415. The active clevis 415 includes a cylindrical piezo-actuator 420 and a pivot 422 mounted to the rudder 7 at the offset point 402. Combined actuation of the hydraulic piston 410 and the piezo-electric actuator 420 moves the rudder 7 a desired lateral deflection distance 8 at wide range of desired frequencies. FIG. 7 is a flowchart of an exemplary vibration suppression method 500 in accordance with an embodiment of the present disclosure. At a block 510, sensors detect motion or vibration. At a block 520, a drive response is derived by a processor. At blocks 530 and 540, the drive response derived at the block 520 is utilized to drive a higher frequency actuator (e.g. a piezo-electric actuator) at the block 530 and to drive a lower frequency actuator (e.g. a hydraulic actuator) at the block 540. In one embodiment, the high frequency actuator may be driven at frequencies greater than or equal to approximately 40 Hz, and the low frequency actuator may be driven at frequencies less than or equal to approximately 25 Hz. In another embodiment, the high frequency actuator may be driven at approximately 45 Hz, and the low frequency actuator may be driven at approximately 15 Hz. In yet another embodiment, the high frequency actuator may be driven at frequencies with the range of approximately 40 Hz to 200 Hz, inclusive, and the low frequency actuator may be driven at frequencies within the range of approximately 0 Hz to 25 Hz. The higher frequency actuator is driven at the block 530 contemporaneously with driving the lower frequency activator at the block 540. Outputs from the higher frequency actuator and the lower frequency actuator from blocks 530 and 540 are combined at a block 550. The combined response produces a control surface movement at a block 560, in opposition to the motion or vibration sensed at the block 510, reducing vibration or motion over both higher frequency and lower frequency ranges. This exemplary method 500 then loops to the Block 510 to again sense motion or vibration.

Figure 8:
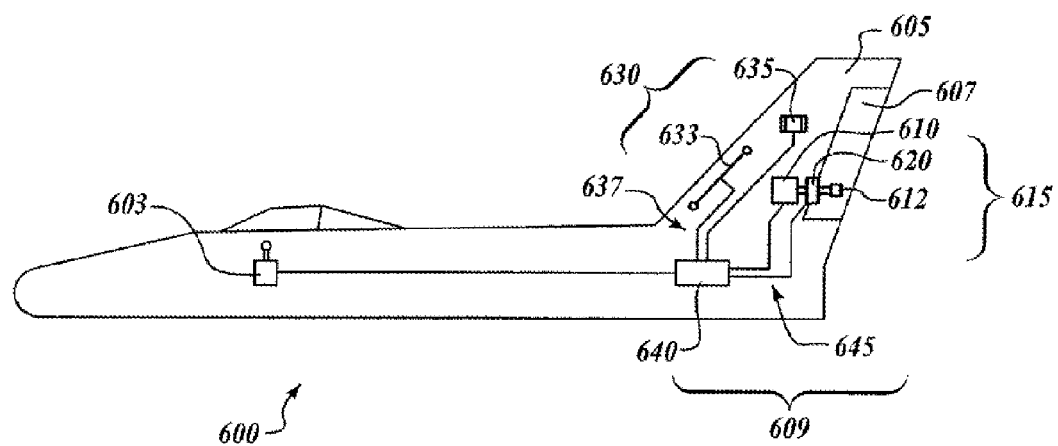
FIG. 8 is a component drawing of an aircraft incorporating a vibration suppression system in accordance with an embodiment of the present disclosure.

FIG. 8 shows an exemplary aircraft 600 incorporating a buffet suppression system 609 in accordance with an embodiment of the present disclosure. The aircraft includes a tail appendage 605. The appendage 605 includes a control surface 607 driven by the buffet suppression system 609. The control surface 607 may move either in response to buffeting or vibrations sensed by a sensor system 630, or in response to control inputs by a pilot (not shown) activating an aircraft control stick 603. The suppression system 609 includes the sensor system 630, a processor 640, and a hybrid actuator 615.

The sensor system 630, by way of example, not limitation, includes an accelerometer 635 and a strain sensor 633. The accelerometer detects movement of the appendage 605 while the strain gauge 633 measures deflection as the appendage 605 bends in response to vibration or buffeting. Sensing information from the accelerometer 635 and the strain gauge 633 are communicated to the processor 640 through sensor cables 637. The processor processes the sensor information, and any input from the aircraft control stick 603 to send output drive information to the hybrid actuator 615. The hybrid actuator 615 is linked by push rod 612 to the control surface 607. The hybrid actuator 615 includes a hydraulic piston 610 and a piezo-electric actuator 620, by way of example, but not limitation, such as an actuator described with reference to FIG. 1, 4 or 5 above. The hybrid actuator 615 can thus deliver control responses to the control surface 607 over a wide range of actuation frequencies and deflections determined by the processor 640 in response to sensor input from the sensor system 630 and the control stick 603. This suitably permits the aircraft to respond to control commands from the pilot as well as to respond to suppress undesired vibration in the appendage 605 as sensed by the sensor system 630. The suppression system 609 advantageously may permit the appendage 605 to be constructed in different configurations and/or of lighter weight materials than if the aircraft 600 did not have the suppression system 609.

While the preferred embodiment of the disclosure has been illustrated and described, as noted above, many changes can be made without departing from the spirit and scope of the disclosure. Accordingly, the scope of the disclosure is not limited by the disclosure of the preferred embodiment. Instead, the disclosure should be determined entirely by reference to the claims that follow.

What is claimed is:

1. A method for providing hybrid actuation, comprising:
providing a first actuator capable of providing a first actuation output movement, wherein the first actuator operates within a first frequency range;
providing a second actuator capable of providing a second actuation output movement, wherein the second actuator operates within a second frequency range different from the first frequency range;
combining the first actuation output movement with the second actuation output movement producing a hybrid actuation movement;
activating the first actuator; and
activating the second actuator.

2. The method of claim 1, wherein:
providing the first actuator includes providing a hydraulic piston.

3. The method of claim 1, wherein:
combining the first actuation output movement with the second actuation output movement includes at least one of linking a pushrod between the first actuator and the second actuator and mounting the first actuator to the second actuator.

4. The method of claim 1, wherein:
combining the first actuation output movement with the second actuation output movement includes at least one of adding the second actuation output movement to the first actuation output movement and subtracting the second actuation output movement from the first actuation output movement.

5. The method of claim 1, wherein:
activating the first actuator includes activating at a frequency between 0 and 25 cycles per second.

6. The method of claim 1, wherein:
activating the second actuator includes activating at a frequency between 40 and 200 cycles per second.

7. The method claim 1, wherein the first range of frequencies is less than or equal to approximately 25 cycles per second, and the second range of frequencies is greater than or equal to approximately 40 cycles per second.

8. The method of claim 1, wherein:
providing the second actuator includes providing a piezo-electric actuator.

9. The method of claim 8, wherein:
the piezo-electric actuator includes a piezo-electric cylinder actuator.

10. A method for providing motion reduction, comprising:
sensing a motion and outputting an indication of motion;
processing the indication of motion and outputting a control response in opposition to the motion
providing a first actuator adapted to receive the control response, the first actuator to operate within a first frequency range;
providing a second actuator adapted to receive the control response, the second actuator to operate within a second frequency range different from the first frequency range;
combining the first actuation movement with the second actuation movement producing a hybrid actuation movement in opposition to the motion;
activating the first actuator in opposition to the motion; and
activating the second actuator in opposition to the motion.

11. The method of claim 10, wherein:
providing the first actuator includes providing a hydraulic piston.

12. The method of claim 10, wherein:
providing the second actuator includes providing a piezo-electric actuator.

13. The method of claim 10, wherein:
combining the first actuation movement with the second actuation movement includes at least one of linking a pushrod between the first actuator and the second actuator and mounting the first actuator to the second actuator.

14. The method of claim 10, wherein:
combining the first actuation movement with the second actuation movement includes at least one of adding the second actuation movement to the first actuation movement and subtracting the second actuation movement from the first actuation movement.

15. The method of claim 10, wherein:
activating the first actuator includes activating at a frequency between 0 and 25 cycles per second.

16. The method of claim 10, wherein:
activating the second actuator includes activating at a frequency between 40 and 200 cycles per second.

17. The method of claim 10, wherein:
sensing a motion includes sensing a deflection of a component.

18. The method of claim 10, wherein:
sensing a motion includes determining an acceleration.

19. The method of claim 10, further comprising:
deflecting a control surface utilizing the hybrid actuation distance.

* * * * *